(12) United States Patent
Filsfils et al.

(10) Patent No.: US 8,542,578 B1
(45) Date of Patent: Sep. 24, 2013

(54) SYSTEM AND METHOD FOR PROVIDING A LINK-STATE PATH TO A NODE IN A NETWORK ENVIRONMENT

(75) Inventors: Clarence Filsfils, Brussels (BE); Ian Michael Charles Shand, Cobham (GB)

(73) Assignee: Cisco Technology, Inc., San Jose, CA (US)

( * ) Notice: Subject to any disclaimer, the term of this patent is extended or adjusted under 35 U.S.C. 154(b) by 389 days.

(21) Appl. No.: 12/850,307

(22) Filed: Aug. 4, 2010

(51) Int. Cl.
*G06F 11/00* (2006.01)
*H04L 12/26* (2006.01)

(52) U.S. Cl.
USPC ............................ 370/228; 370/230; 370/235

(58) Field of Classification Search
USPC ................. 370/216–228, 248–250, 252, 351, 370/389, 392, 400, 464–465
See application file for complete search history.

(56) References Cited

U.S. PATENT DOCUMENTS

| | | | |
|---|---|---|---|
| 4,956,835 A | 9/1990 | Grover et al. |
| 5,117,422 A | 5/1992 | Hauptschein et al. |
| 5,243,592 A | 9/1993 | Perlman et al. |
| 5,412,654 A | 5/1995 | Perkins |
| 5,748,901 A | 5/1998 | Afek et al. |
| 5,825,772 A | 10/1998 | Dobbins et al. |
| 5,914,953 A | 6/1999 | Krause et al. |
| 5,959,968 A | 9/1999 | Chin et al. |
| 6,018,576 A | 1/2000 | Croslin |
| 6,032,192 A | 2/2000 | Wegner |
| 6,032,194 A | 2/2000 | Gai et al. |
| 6,044,075 A | 3/2000 | Le Boudec et al. |
| 6,098,107 A | 8/2000 | Narvaez-Guarnieri et al. |
| 6,111,257 A | 8/2000 | Shand et al. |
| 6,128,750 A | 10/2000 | Espy et al. |
| 6,185,598 B1 | 2/2001 | Farber |
| 6,243,754 B1 | 6/2001 | Guerin et al. |
| 6,246,669 B1 | 6/2001 | Chevalier et al. |
| 6,256,295 B1 | 7/2001 | Callon |
| 6,295,275 B1 | 9/2001 | Croslin |

(Continued)

FOREIGN PATENT DOCUMENTS

| AU | 2004306884 | 4/2005 |
|---|---|---|
| AU | 2004311004 B2 | 6/2005 |

(Continued)

OTHER PUBLICATIONS

PCT "Written Opinion of the International Searching Authority," for PCT/US2006/06238, mailed Oct. 16, 2006, 5 pages.

(Continued)

*Primary Examiner* — Warner Wong
(74) *Attorney, Agent, or Firm* — Patent Capital Group

(57) ABSTRACT

An example method is provided and includes advertising information to network elements in a network environment. The information advertises a reachability characteristic of a first Internet protocol (IP) address associated with a first network element, and a second IP address associated with a second network element to which packets are to be sent instead of the first network element. The method also includes receiving the packets at the first network element, the packets being delivered from the second network element based on the information. In specific implementations, a preferred adjacency characteristic is identified in the information by a sub-TLV for routing the packets from the second network element to the first network element. If a failure occurs and a loop free alternate (LFA) protection mechanism is provisioned, the packets are sent via a label distribution protocol (LDP) label switched path (LSP) toward a designated interface of a network element.

20 Claims, 7 Drawing Sheets

(56) References Cited

U.S. PATENT DOCUMENTS

| | | |
|---|---|---|
| 6,321,271 B1 | 11/2001 | Kodialam et al. |
| 6,343,122 B1 | 1/2002 | Andersson |
| 6,349,091 B1 | 2/2002 | Li |
| 6,356,546 B1 | 3/2002 | Beshai |
| 6,389,764 B1 | 5/2002 | Stubler et al. |
| 6,473,421 B1 | 10/2002 | Tappan |
| 6,507,577 B1 | 1/2003 | Mauger et al. |
| 6,578,086 B1 | 6/2003 | Regan et al. |
| 6,690,671 B1 | 2/2004 | Anbiah et al. |
| 6,697,325 B1 | 2/2004 | Cain |
| 6,697,333 B1 | 2/2004 | Bawa et al. |
| 6,704,320 B1 | 3/2004 | Narvaez et al. |
| 6,711,125 B1 | 3/2004 | Walrand et al. |
| 6,714,551 B1 | 3/2004 | Le-Ngoc |
| 6,717,950 B2 | 4/2004 | Lui et al. |
| 6,718,382 B1 | 4/2004 | Li et al. |
| 6,721,269 B2 | 4/2004 | Cao et al. |
| 6,744,727 B2 | 6/2004 | Liu et al. |
| 6,744,774 B2 | 6/2004 | Sharma |
| 6,778,531 B1 | 8/2004 | Kodialam et al. |
| 6,882,627 B2 | 4/2005 | Pieda et al. |
| 6,928,484 B1 | 8/2005 | Huai et al. |
| 6,944,131 B2 | 9/2005 | Beshai et al. |
| 6,950,870 B2 | 9/2005 | Beaulieu |
| 6,982,951 B1 | 1/2006 | Doverspike et al. |
| 6,987,727 B2 | 1/2006 | Fredette et al. |
| 6,990,068 B1 | 1/2006 | Saleh et al. |
| 6,996,065 B2 | 2/2006 | Kodialam et al. |
| 7,035,202 B2 | 4/2006 | Callon |
| 7,035,209 B2 | 4/2006 | Dang |
| 7,058,016 B1 | 6/2006 | Harper et al. |
| 7,099,286 B1 | 8/2006 | Swallow |
| 7,113,481 B2 | 9/2006 | Elie-Dit-Cosaque et al. |
| 7,158,486 B2 | 1/2007 | Rhodes |
| 7,165,574 B2 * | 1/2007 | Ryuen et al. ............ 137/596.17 |
| 7,177,295 B1 | 2/2007 | Sholander et al. |
| 7,242,664 B2 | 7/2007 | Einstein et al. |
| 7,246,172 B2 | 7/2007 | Yoshiba et al. |
| 7,260,645 B2 | 8/2007 | Bays |
| 7,272,146 B2 | 9/2007 | Yamauchi |
| 7,274,654 B2 | 9/2007 | Yan et al. |
| 7,274,658 B2 | 9/2007 | Bornstein et al. |
| 7,317,731 B2 | 1/2008 | Seddigh et al. |
| 7,343,423 B2 | 3/2008 | Goguen et al. |
| 7,355,980 B2 | 4/2008 | Bauer et al. |
| 7,366,099 B2 | 4/2008 | Shand |
| 7,366,191 B2 | 4/2008 | Higashiyama |
| 7,389,359 B2 | 6/2008 | Jain et al. |
| 7,414,997 B2 | 8/2008 | Lauer |
| 7,420,989 B2 | 9/2008 | Liu et al. |
| 7,428,213 B2 | 9/2008 | Vasseur et al. |
| 7,490,165 B1 | 2/2009 | Katukam et al. |
| 7,502,314 B2 | 3/2009 | Shimizu |
| 7,508,755 B2 | 3/2009 | Liu |
| 7,519,009 B2 | 4/2009 | Fleischman |
| 7,609,619 B2 | 10/2009 | Naseh et al. |
| 7,619,965 B2 | 11/2009 | Kobayashi et al. |
| 7,646,739 B2 | 1/2010 | Previdi et al. |
| 7,689,693 B2 | 3/2010 | Doshi et al. |
| 7,698,463 B2 | 4/2010 | Ogier et al. |
| 7,701,940 B2 * | 4/2010 | Novello et al. ............ 370/390 |
| 7,707,307 B2 | 4/2010 | Miles et al. |
| 8,068,411 B2 * | 11/2011 | Vasseur et al. ............ 370/227 |
| 8,270,317 B2 * | 9/2012 | Xia et al. .................. 370/254 |
| 2002/0093954 A1 | 7/2002 | Weil et al. |
| 2002/0112072 A1 | 8/2002 | Jain et al. |
| 2002/0116669 A1 | 8/2002 | Jain |
| 2002/0171886 A1 | 11/2002 | Wu et al. |
| 2003/0007500 A1 | 1/2003 | Rombeaut et al. |
| 2003/0063613 A1 | 4/2003 | Carpini et al. |
| 2003/0103449 A1 * | 6/2003 | Barsheshet et al. ......... 370/222 |
| 2003/0117950 A1 | 6/2003 | Huang |
| 2003/0123457 A1 | 7/2003 | Koppol |
| 2003/0202473 A1 | 10/2003 | Patrick et al. |
| 2003/0233595 A1 | 12/2003 | Charney et al. |
| 2004/0117251 A1 | 6/2004 | Shand |
| 2004/0151181 A1 | 8/2004 | Chu et al. |
| 2005/0013241 A1 | 1/2005 | Beller et al. |
| 2005/0031339 A1 | 2/2005 | Qiao et al. |
| 2005/0068968 A1 | 3/2005 | Ovadia et al. |
| 2005/0265228 A1 | 12/2005 | Fredette et al. |
| 2006/0018253 A1 | 1/2006 | Windisch et al. |
| 2006/0031482 A1 | 2/2006 | Mohan et al. |
| 2006/0092941 A1 | 5/2006 | Kusama |
| 2006/0140111 A1 | 6/2006 | Vasseur et al. |
| 2006/0140190 A1 | 6/2006 | Lee |
| 2006/0187819 A1 | 8/2006 | Bryant et al. |
| 2006/0198308 A1 * | 9/2006 | Vasseur et al. ............ 370/238 |
| 2006/0291446 A1 | 12/2006 | Caldwell et al. |
| 2007/0005784 A1 | 1/2007 | Hares et al. |
| 2007/0011284 A1 | 1/2007 | Le Roux et al. |
| 2007/0011351 A1 | 1/2007 | Bruno et al. |
| 2007/0091793 A1 | 4/2007 | Filsfils et al. |
| 2007/0091794 A1 | 4/2007 | Filsfils et al. |
| 2007/0091795 A1 | 4/2007 | Bonaventure et al. |
| 2007/0115810 A1 | 5/2007 | Stamatelakis et al. |
| 2008/0025203 A1 | 1/2008 | Tallet |
| 2008/0062986 A1 | 3/2008 | Shand et al. |
| 2008/0089227 A1 | 4/2008 | Guichard et al. |
| 2008/0123651 A1 * | 5/2008 | Vasseur et al. ............ 370/392 |
| 2008/0192627 A1 | 8/2008 | Lichtwald |
| 2008/0219153 A1 | 9/2008 | Shand et al. |
| 2008/0225864 A1 * | 9/2008 | Aissaoui et al. ............ 370/401 |
| 2008/0316914 A1 * | 12/2008 | Vercellone et al. ......... 370/216 |
| 2008/0317055 A1 | 12/2008 | Zetterlund et al. |
| 2009/0129771 A1 | 5/2009 | Saniee et al. |
| 2010/0302973 A1 * | 12/2010 | Lange et al. ............... 370/254 |

FOREIGN PATENT DOCUMENTS

| | | |
|---|---|---|
| CA | 2537898 A1 | 4/2005 |
| CA | 2546802 A1 | 6/2005 |
| CN | 1440159 A | 9/2003 |
| CN | 1879356 | 12/2006 |
| CN | 1943167 | 4/2007 |
| CN | 101099086 | 1/2008 |
| EP | 1851559 | 8/2006 |
| WO | WO 01/78278 | 10/2001 |
| WO | WO 02/06918 | 1/2002 |
| WO | WO 2005/039109 A1 | 4/2005 |
| WO | WO 2005/053234 A1 | 6/2005 |
| WO | WO 2005/055499 A2 | 6/2005 |
| WO | WO 2005/055499 A3 | 6/2005 |
| WO | 2006/091652 A2 | 8/2006 |
| WO | 2006/091652 A3 | 8/2006 |

OTHER PUBLICATIONS

PCT "International Preliminary Report on Patentability," for PCT/US2006/06238, mailed Aug. 28, 2007, 6 pages.

EPO Search Opinion, for EP Application No. 06720965, mailed Jul. 21, 2009, 4 pages.

EPO Supplementary Search Report, for EP Application No. 06720965, mailed Jul. 21, 2009, 1 page.

Moy, J. et a., "ISPF Version 2," IETF Standard. Network Working Group, RFC 2328, Internet Engineering Task Force, IETF, Apr. 1998, 245 pages.

PCT International Search Report mailed Jan. 13, 2005 for PCT/US01/18333; 1 page.

PCT International Search Report mailed Aug. 2, 2001 for PCT/US01/11548; 1 page.

EPO Communication mailed May 2, 2011 for EP Application No. 06720965; 5 pages.

Andersson, L. et al., "LDP Sopecification," Network Working Group RFC 3036, Jan. 2001; http://www.rfc-editor.org/rfc/pdfrfc/rfc3036.txt.pdf; 132 pgs.

Bryant, S. et al., "IP Fast Reroute Using Tunnels," Network Working Group, Internet Draft, May 2004; http://tools.ietf.org/pdf/draft-bryant-ipfrr-tunnels-00.pdf; 30 pgs.

Pan, P. et al., "Fast Reroute Extensions to RSVP-TE for LSP Tunnels," Networking Working Grop RFC 4090, May 2005; http://tools.ietf.org/pdf/rfc4090.pdf; 39 pgs.

Shand, M. et al., "IP Fast Reroute Framework," Network Working Group, Internet Draft, Jun. 2004; http://tools.ietf.org/pdf/draft-ietf-rtgwg-ipfrr-framework-01.pdf; 11 pgs.

Torup, Mikkel, "Fortifying OSPF/IS-IS Against Link-failure," AT&T Labs-Research, Sep. 7, 2001; 10 pgs.

Tian, Albert J. et al., "Loose Segment Optimization in Explicit Paths," Network Working Group, Internet Draft, Jul. 2004; http://tools.ietf.org/pdf/draft-tian-rsvp-loose-seg-opt-00.pdf; 9 pgs.

Tian, Albert J. et al., "Source Routed MPLS LSP Using Domain Wide Label," Network Working Group, Internet Draft, Jul. 2004; http://tools.ietf.org/pdf/draft-tian-mpls-lsp-source-route-01.pdf, 13 pgs.

Zinin, Alex, "Analysis and Minimization of Microloops in Link-state Routing Protocols," Network Working Group, Internet Draft, Oct. 2005, http://tools.ietf.org/pdf/draft-ietf-rtgwg-microloop-analysis-01.pdf; 17 pgs.

Raju et al., "A New Approach to On-Demand Loop-Free Multipath Routing," Computer Communications and Networks, 1999, IEEE, Oct. 1999; http;//ccrg.soe.ucsc.edu/publications/jyoti.icccn99.pdf; 6 pgs.

* cited by examiner

SYSTEM AND METHOD FOR PROVIDING A LINK-STATE PATH TO A NODE IN A NETWORK ENVIRONMENT

TECHNICAL FIELD

This disclosure relates in general to the field of path management in network communications and, more particularly, to providing a link-state path to a node in a network environment.

BACKGROUND

The field of communications has become increasingly important in today's society. One area of interest in communications deals with the effective management of pseudowires in a network environment. Typically, the utilization of pseudowires can consume significant system resources, and it often entails significant management oversight. In addition, network traffic steering is commonly neglected, as network elements (e.g., routers) are commonly provisioned in an arbitrary manner, which can unnecessarily test their capacities. As a general proposition, managing the use of pseudowires, without sacrificing performance, presents a significant challenge to equipment vendors, network operators, and system designers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method is provided and includes advertising information to network elements in a network environment. The information advertises a reachability characteristic of a first Internet protocol (IP) address associated with a first network element, and a second IP address associated with a second network element to which packets are to be sent instead of the first network element. The method also includes receiving the packets at the first network element, the packets being delivered from the second network element based on the information. In specific implementations, a preferred adjacency characteristic is identified in the information by a sub-TLV for routing the packets from the second network element to the first network element. If a failure occurs and a loop free alternate (LFA) protection mechanism is provisioned, the packets are sent via a label distribution protocol (LDP) label switched path (LSP) toward a designated interface of a network element.

In more detailed configurations, the first IP address is associated with a router having multiple loopback IP addresses that can be used for internal re-routing of incoming packets for the router. The first IP address can be associated with a router that includes multiple line cards coupled to multiple interfaces. The information can include a sub-TLV that designates at least one of the interfaces over which packets are to be received. The information can include a sub-TLV that includes a weight attribute associated with a backup pathway for routing packets. The information includes a sub Type Length Value (sub-TLV) to be provided in a link state packet TLV. The sub-TLV identifies the second IP address associated with the second network element, and the sub-TLV can be encapsulated in a TLV field of one or more link state protocol packets.

EXAMPLE EMBODIMENTS

Figure 1:
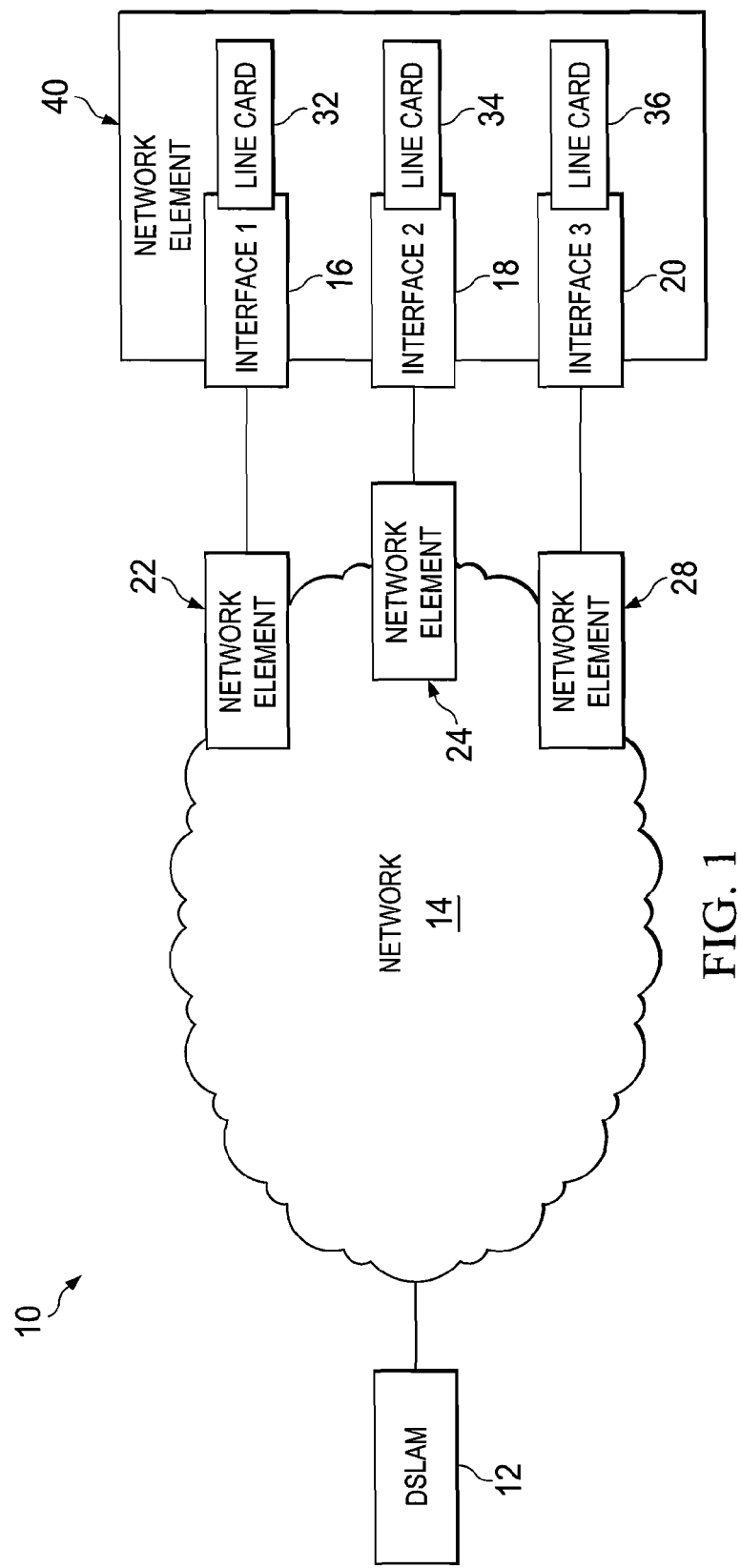
FIG. 1 is a simplified block diagram of a communication system for providing a preferred link-state path to a node in a network environment in accordance with one embodiment of the present disclosure.

Turning to FIG. 1, FIG. 1 is a simplified block diagram illustrating a communication system 10 for providing a preferred link-state path to a node in a network environment. Note that the following discussions include pseudowire nomenclature, link state protocols, etc., but communication system 10 is equally applicable to other systems, protocols, formatting, links, etc. In the particular example of FIG. 1, communication system 10 includes a digital subscriber line access multiplexer (DSLAM) 12 coupled to a network 14, which interfaces with a plurality of network elements 22, 24, 28. Communication system 10 also includes a network element 40, which represents a destination to which packets can be routed via network elements 22, 24, and 28. In this particular example, network element 40 has an interface 1 16, an interface 2 18, and an interface 3 20. Network element 40 also includes a line card 32, a line card 34, and a line card 36, which are coupled to interface 1, interface 2, and interface 3 respectively. On its other network side, each respective interface 16, 18, and 20 is coupled to network elements, 22, 24, and 28. Network element 40 also includes a port address R and a port address S, which are not illustrated for purposes of simplification.

In one embodiment, communication system 10 may be configured to select specific line cards to be designated to terminate specific pseudowires and, further, to store appropriate pseudowire state information. This could reduce the overhead of other line cards, which would not be burdened with terminating certain pseudowires and, therefore, the line cards would not be required to store pseudowire state information. Additionally, by liberating those resources of a given line card, a given network element (e.g., a router) would be empowered to terminate other pseudowires (e.g., through storage of the state information of additional pseudowires), which ultimately increases the total number of pseudowires being terminated by the architecture.

Generally, the principles of the present disclosure enable a network operator to intelligently steer traffic destined for a given network element via a well identified and controlled subset of interfaces. The routing can be automated through this particular set of interfaces, which can enhance the capabilities of interior gateway protocols (IGPs), or any other suitable communication mechanism (e.g., intermediate system-to-intermediate system (IS-IS) protocols, open shortest path first (OSPF) protocols, etc.). Note that although the following embodiments are discussed in regards to these communication protocols, the principles of the present disclosure are equally applicable to other protocols for which intelligent network management is sought.

For purposes of illustrating certain example techniques of communication system 10, it is important to understand the pseudowire termination issues applicable to most routers operating in a network. The following foundational information may be viewed as a basis from which the present disclosure may be properly explained. Generally, in computer networking and telecommunications, a pseudowire is an emulation of a layer-two (L2) point-to-point connection-oriented (or connection-less) service over a packet switched network (PSN). The pseudowire can emulate an operation of a transparent wire, which carries a service. Packets destined to a service, such as a pseudowire service, could ingress a network element on any of its interfaces.

One type of interface that is common to a network element is a loopback interface. A loopback more generally refers to traffic that a computer program sends to a particular interface, which is received on the same network element at a different interface. Various services (e.g., pseudowire services) often employ a loopback, where such loopbacks have various applications and uses in network administration. Many architectures have the ability to steer packets along non-standard routes in various ways, but each of these architectures has disadvantages. For example, in some architectures, a separate address is used to invoke each alternative protection path. Additionally, a separate routing computation, such a constrained Shortest Path First (cSPF) computation is typically executed to compute a protection path to avoid certain network devices. However, these mechanisms create unwanted administrative overhead.

In accordance with certain embodiments of the present disclosure, communication system 10 can address these and other issues by utilizing an intelligent Type-length-value (TLV) mechanism to be included in information advertised in the network (e.g., any type of advertising message between network elements). In general terms, a sub-TLV for (extended) IP reachability can be designated to better steer traffic. The sub_TLV can be used inside a TLV to encapsulate message elements. In a general sense, a TLV can be qualified by several VIA sub-TLVs. In operational terms, the VIA sub-TLV allows communication system 10 to manage traffic in the following manners. First, the traffic can be routed to a certain destination network element (e.g., network element 40) via a specific neighbor (a VIA node) such as network element 22. Additionally, the traffic can traverse a specific adjacency from this specific neighbor (a VIA adjacency) to a destination network element (i.e., a connection over a specified interface of network element 40). In a further embodiment, primary/backup policies are possible by using a weight attribute of the VIA sub-TLV, as further detailed below. Moreover, load-balancing can be achieved for multiple adjacencies between a preferred neighbor network element and the destination network element.

In certain embodiments, pseudowire packets can ingress network element 40 through a selected interface set on a first given neighbor, and otherwise ingress via a given interface set on a different second neighbor. This can occur during both steady state (i.e., when there is network convergence) and also during loop free alternates (LFA) protection. Certain embodiments presented herein provide a valid LFA: valid in the sense of providing backups. Furthermore, packets ultimately arrive at the targeted destination, which stands in contrast to standard LFA procedures.

For example, a first pseudowire between DSLAM 12 and address R on network element 40 has a primary interface that is designated as interface 1 from network element 22, and a backup interface that is designated as interface 2 from network element 24. In this arrangement, line card 36 is not configured for terminating certain pseudowires, which allows it to be free for the termination of other pseudowires: inherently increasing the overall pseudowire termination capacity of network element 40. Semantically, network addresses can be used in routing, where a normal path for routing is modified for use with a VIA sub-TLV. In such instances, there is no additional SPF being run, and instead a straightforward replacement of forwarding information base (FIB) data for a destination network element can be used.

In one particular signaling example, a VIA sub-TLV includes some type of adjacency characteristic (e.g., identifying a network element, or a specific interface, or a specific line card, etc. for routing purposes). For example, a sub-TLV could contain the following information: VIA_NODE, VIA_ADJ, WEIGHT, and BACKUP_FEC. A VIA_NODE reflects the identity of a node, such as network element 22 that is a direct neighbor of an advertising node (e.g., network element 40). VIA_ADJ reflects the identity of an adjacency from VIA_NODE to the advertising network element. For example, in the example case involving an IS-IS point-to-point (pt-pt) circuit (employing a three-way-handshake), the VIA_ADJ could be an extended-local-circuit-ID, as identified in an IS-IS HELLO message from the VIA_NODE.

Figure 2:
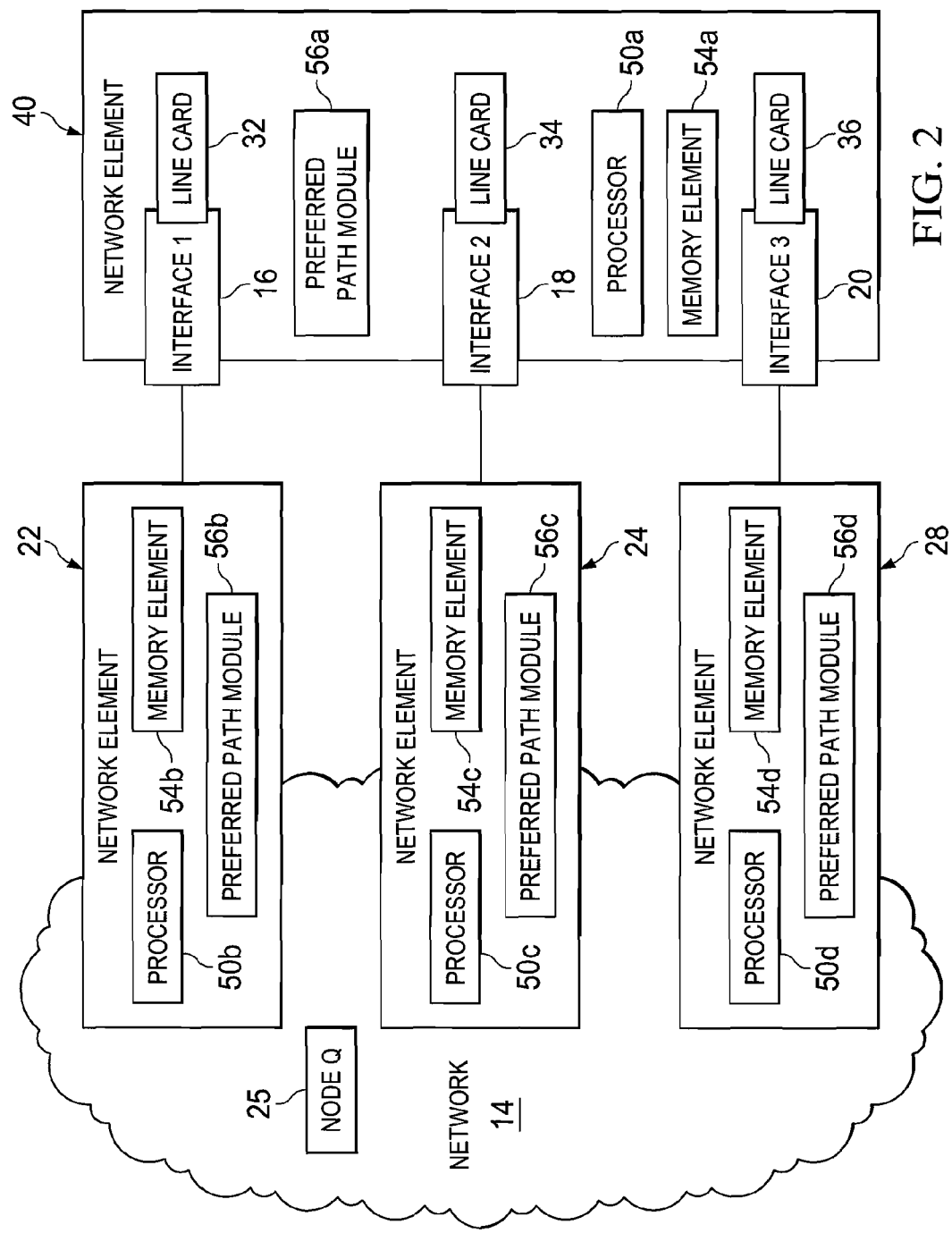
FIG. 2 is a simplified block diagram illustrating details associated with the system in accordance with one embodiment of the present disclosure.

Turning to FIG. 2, FIG. 2 is a simplified block diagram illustrating additional details related to an example infrastructure of communication system 10. As illustrated in FIG. 2, each of network elements 22, 24, 28, and network element 40 each include a respective processor 50a-d, a respective memory element 54a-d, and a respective preferred path module 56a-d. Each of these network elements 22, 24, 28, and 40 can also include suitable interfaces for receiving and/or transmitting data (e.g., interface 1, interface 2, and interface 3). Preferred path modules 56a-d can readily interact with each other in order to exchange routing data, commands, etc.

In operation of an example used for purposes of teaching, network element 40 includes two loopbacks: addresses R and S. A pseudowire can be instantiated from a DSLAM (on one side of network 14) to address R in network element 40. Network element 40 is connected to network 14 via several interfaces on separate line cards, as is illustrated in FIG. 2. There are three respective neighboring network elements in this example: network elements 22, 24, and 28. Further, in this particular example, there is a node (node Q 25) present in this topology, where node Q 25 resides on the path from the DSLAM to network element 40. [Note that the following abbreviations are used for purposes of discussion below (particularly in certain signaling flows): Node 1=N1 (which can represent network element 22); Node 2=N2 (which can represent network element 24); Node 3=N3 (which can represent network element 28); Interface 1=I1 (which can represent interface 1 16); Interface 2=I2 (which can represent interface 2 18); Interface 3=I3 (which can represent interface 3 20).]

Preferred path module 56a is configured to ensure that packets destined to address R are received via interface 1 (i.e., a primary interface) or via interface 2 (a suitable backup), but not over interface 3. Therefore, preferred path module 56a advertises address R with the following two VIA sub-TLVs: a) (VIA_NODE: N1, VIA_ADJ: I1, WEIGHT: 10, BACKUP_FEC: S); and b) (VIA_NODE: N2, VIA_ADJ: I2, WEIGHT: 100, BACKUP_FEC: NULL). Furthermore, preferred path module 56a advertises address S with the following two VIA sub-TLVs: a) (VIA_NODE: N2, VIA_ADJ: I2, WEIGHT: 10, BACKUP_FEC: R); and b) (VIA_NODE: N1, VIA_ADJ: I1, WEIGHT: 100, BACKUP_FEC: NULL).

If communication system 10 has a steady state, where network element 22 and interface 1 are functional, then any node Q that is different from network element 22 would use the path to network element 22 as a best path to address R. Hence, all traffic destined to address R is forwarded to network element 22. Network element 22 can then use the VIA_ADJ (i.e., interface 1) to reach address R in network element 40. If communication system 10 is in a steady state, and interface 1 is not functional, then any node Q that is different from network element 22 would use the path to network element 24 as a best path to address R. Hence, all traffic destined to address R would be forwarded to network element 24. Network element 24 can then use the VIA_ADJ (i.e., interface 2 18) to reach address R.

For the specific instance of a transient LFA protection associated with a remote failure (i.e., interface 1 is not the interface that is failing), any node Q (where node Q is different than network element 22) can use the LFA path to network element 22 as the LFA path to address R. Hence, all traffic destined to address R would be first forwarded to network element 22. Network element 22 can then use the VIA_ADJ interface 1 to reach address R.

In the event that communication system 10 has not yet converged after a failure, the following describes a transient LFA protection upon local failure (i.e., interface 1 is failing). First, instead of network element 22 sending the packets along interface 1 (and destined for address R), network element 22 would send them via a label distribution protocol (LDP) label switched path (LSP) protocol related to a forwarding equivalence class (FEC)). The VIA sub-TLVs applied on route S would ensure that this LDP LSP reaches network element 40 via interface 2.

Network element 40 can aggregate thousands of pseudowires through various sets of designated line cards, such as line cards 32, 34. An operator can direct, for example, 50% of the pseudowires toward address R and 50% toward address S, where addresses R and S represent primary addresses for their respective line cards. In a further embodiment, each line card 32 and 34 supports half of the load in a steady state, while protecting the other line card in case of a primary interface failure. Furthermore, this would still allow other line cards to be configured to terminate additional pseudowires. Such a strategy can allow the network operator to achieve better performance with minimal configuration (i.e., simply configuring preferred path module 56a that originates the route and that can be provisioned with a specific VIA routing policy). The rest of network 14 (including network elements 22, 24, and 28) can learn and apply the policy through their preferred path modules 56b-d, which can readily interpret the messaging being sent by preferred path module 56a.

Note that in an environment such as digital IP telephony (DT) with a newer generation access network, preferred path modules 56a-d can ensure that a given pseudowire is received by a service node: either on a primary line card or on a secondary line card of network element 40. Other line cards of a service node would not need to host state information for the related pseudowire. Hence, network element 40 can aggregate a greater number of pseudowires on a distributed-architecture that includes service processing engines. For example, a carrier routing system (CRS) line card may only terminate two thousand pseudowires. If all possible pseudowires are installed on all line cards in a conventional sixteen-slot CRS, then a conventional sixteen-slot CRS can only support two thousand pseudowires, as context information is maintained for any possible pseudowire on each line card. However, with the selection of primary and secondary line cards, and with the storing of state information of selected pseudowires on selected line cards, a sixteen-line card could support sixteen thousand pseudowires. This is because state information for each pseudowire is not stored in each line card 32, 34, 36: state information is only being maintained for pseudowires for which a given line card is designated responsibility.

Before turning to additional capabilities and operations associated with FIG. 2, a brief discussion is provided about the infrastructure of FIGS. 1-2. Network elements 22, 24, 28, and 40 are network elements that generally manage (or that cooperate with each other in order to manage) routing in a network environment. In one particular instance, each of these network elements are routers configured with interfaces and line cards for packet exchanges in a network environment. As used herein in this disclosure, the term network element is meant to encompass routers, nodes, switches, gateways, bridges, loadbalancers, firewalls, applications, application program interfaces (APIs), inline service nodes, proxies, servers, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information. Note that the term 'node' and 'network element' may be used interchangeably in this disclosure.

In one example implementation, network elements 22, 24, 28, and 40 include software (e.g., provided by preferred path modules 56a-d) to achieve the engineering-preferred path function operations, as outlined herein in this disclosure. This can include potential activities being performed in conjunction with respective memory elements 54a-d and/or respective processors 50a-d. Note that the processing and the software (e.g., particular modules) can be consolidated in any fashion. In other embodiments, this preferred path feature of routing may be provided externally to any of the aforementioned elements, or included in some other network element to achieve this intended functionality. Alternatively, several elements may include software (or reciprocating software) that can coordinate with each other in order to achieve the operations, as outlined herein. In still other embodiments, any of the network elements of FIGS. 1-2 may include any suitable algorithms, hardware, software, components, modules, interfaces, or objects that facilitate these preferred engineering-path routing operations.

In one example implementation, networks elements 22, 24, 28, and 40 include memory elements for storing information to be used in achieving the preferred path functions outlined herein. Additionally, networks elements 22, 24, 28, and 40 may include a processor that can execute software or an algorithm to perform the preferred path routing activities, as discussed in this disclosure. These devices may further keep information in any suitable memory element (random access memory (RAM), read only memory (ROM), erasable programmable read only memory (EPROM), an electrically erasable programmable ROM (EEPROM), application specific integrated circuit (ASIC), etc.), software, hardware, or in any other suitable component, device, element, or object where appropriate and based on particular needs. Any possible memory items (e.g., database, queue, table, cache, etc.)

should be construed as being encompassed within the broad term memory element. Similarly, any of the potential processing elements, modules, and machines described in this disclosure should be construed as being encompassed within the broad term processor.

Note that network elements 22, 24, 28, and network element 40 may share (or coordinate) certain processing operations. Using a similar rationale, their respective memory elements may store, maintain, and/or update data in any number of possible manners. Additionally, because some of these network elements can be readily combined into a single unit, device, or server (or certain aspects of these elements can be provided within each other), some of the illustrated processors may be removed, or otherwise consolidated such that a single processor and/or a single memory location could be responsible for certain activities associated with preferred engineering path routing controls. In a general sense, the arrangements depicted in FIGS. 1-3 may be more logical in their representations, whereas a physical architecture may include various permutations/combinations/hybrids of these elements.

Network 14 represents a series of points or nodes of interconnected communication paths for receiving and transmitting packets of information that propagate through communication system 10. Network 14 offers a communicative interface between network elements, devices, etc. and may be any local area network (LAN), wireless LAN (WLAN), virtual local area network (VLAN), metropolitan area network (MAN), wide area network (WAN), extranet, Intranet, virtual private network (VPN), or any other appropriate architecture or system that facilitates data propagation in a network environment. Network 14 can support a transmission control protocol (TCP)/IP, or a user datagram protocol (UDP)/IP in particular embodiments of the present disclosure; however, network 14 may alternatively implement any other suitable communication protocol for transmitting and receiving data packets within communication system 10. Network 14 can foster various types of communications and, further, be replaced by any suitable network components for facilitating the propagation of data between participants in a conferencing session. [Note that data, as used herein in this document, refers to any type of numeric, voice, video, media, or script data, or any type of source or object code, or any other suitable information in any appropriate format that may be communicated from one point to another.]

Figure 3:
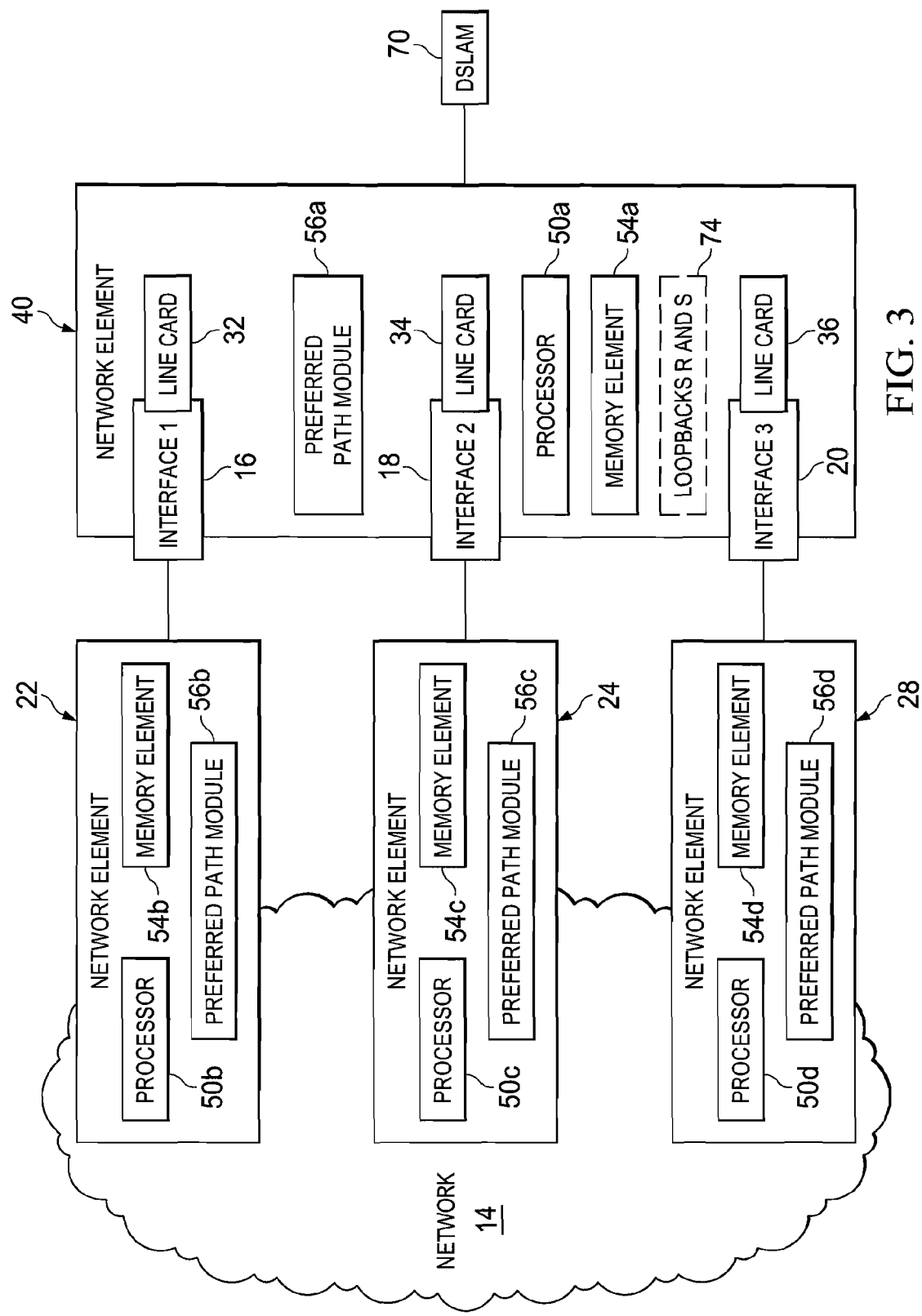
FIG. 3 is a simplified block diagram illustrating details of another system in accordance with one embodiment of the present disclosure.

Turning to FIG. 3, FIG. 3 illustrates an example variation of communication system 10 according to one embodiment of the present disclosure. FIG. 3 illustrates network element 40, which includes an element for loopbacks R and S 74, and which is coupled to a DSLAM 70. In FIG. 3, a shortest path from node Q (discussed previously in FIG. 2) to a preferred VIA_NODE (e.g., network element 22) can traverse the destination node itself (i.e., network element 40). Hence, if a shortest path were the only criterion to be used, network element 40 would receive the traffic destined to address R on an incorrect interface (i.e., the interface between network element 40 and DSLAM 70). This could lead to pseudowire failure issues in worst case scenarios.

To obviate these problematic issues, the architecture of FIG. 3 can include an installation of an FIB entry for an address R on a primary and a backup line card (e.g., line cards 32 and/or 34). At address R, the packet would be received and the pseudowire terminated. Other line cards of network element 40 would be programmed with the FIB entry for address R, which forwards traffic through network element 40 itself to a correct egress primary line card, which then suitably processes the packet. If such an internal-redirection between line cards 32, 34, 36 is not possible, then the FIB entry non-primary/backup line card could point to the preferred next-hop (N1).

In one particular use case (and with reference to the architecture illustrated in FIG. 3), a receive FIB entry for address R is installed on line cards 32, 34, which are employed as primary and backup line cards. In this particular instance, other line cards 36 of network element 40 are programmed with a FIB entry for address R, which forwards the traffic through network element 40 to a correct egress line card, where the packet can be suitably processed. From an operational perspective, traffic coming from DSLAM 70 to network element 40 would not be received by network element 40 on the wrong interface. Instead, traffic can be switched to network element 22, which would return the traffic to network element 40 via the preferred adjacency interface 1 (i.e., toward the preferred line card 32, which would receive the packet, terminate the pseudowire, and forward the packet to loopbacks R and S 74). In an alternative approach, DSLAM 70 could encapsulate its traffic on an LSP to the preferred neighbor (network element 22), where this would include DSLAM 70 understanding the preferred neighbors label mapping for FEC=R.

Figure 4:
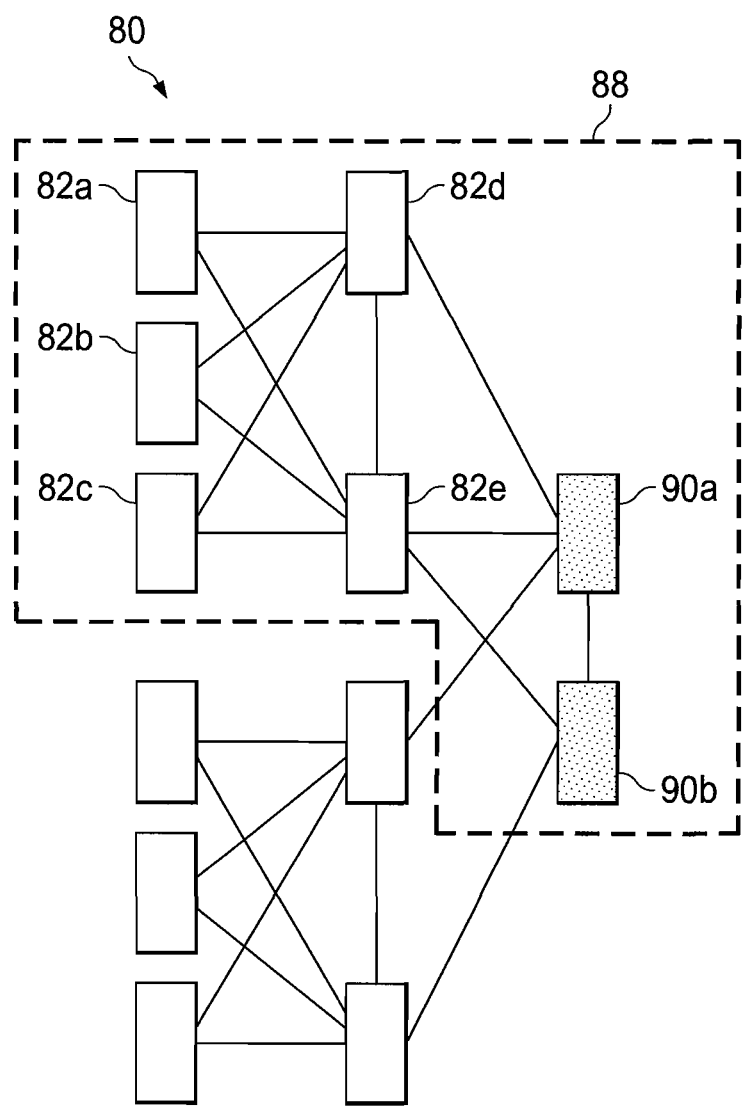
FIG. 4 is a simplified diagram of a ladder system in accordance with one embodiment of the present disclosure.

Turning to FIG. 4, FIG. 4 illustrates a simplified diagram of a communication system 80 that includes multiple ladders according to one embodiment of the present disclosure. A ladder 88 comprises two destination network elements 90a-b, a set of DSLAMS 82a-c, and a set of routers 82d-e in this configuration. In this particular example of FIG. 4, a path between DSLAMs 82a-c and destination network elements 90a-b does not exit the ladder. Similarly, DSLAMs 82a-c do not reach destination network elements 90a-b via any mid-point node that does not belong to the ladder. Therefore, the ladder can be analyzed in isolation. Appropriate ingress and egress nodes can be determined by a preferred path mechanism (e.g., preferred path module 56a), which can use VIA sub-TLVs. Note that the propagation of these sub-TLVs through the network would not affect the behavior of another, distinct ladder coupled to network elements 90a-b. Furthermore, the preferred path modules can readily be distributed to the network elements of the ladder.

Figure 5:
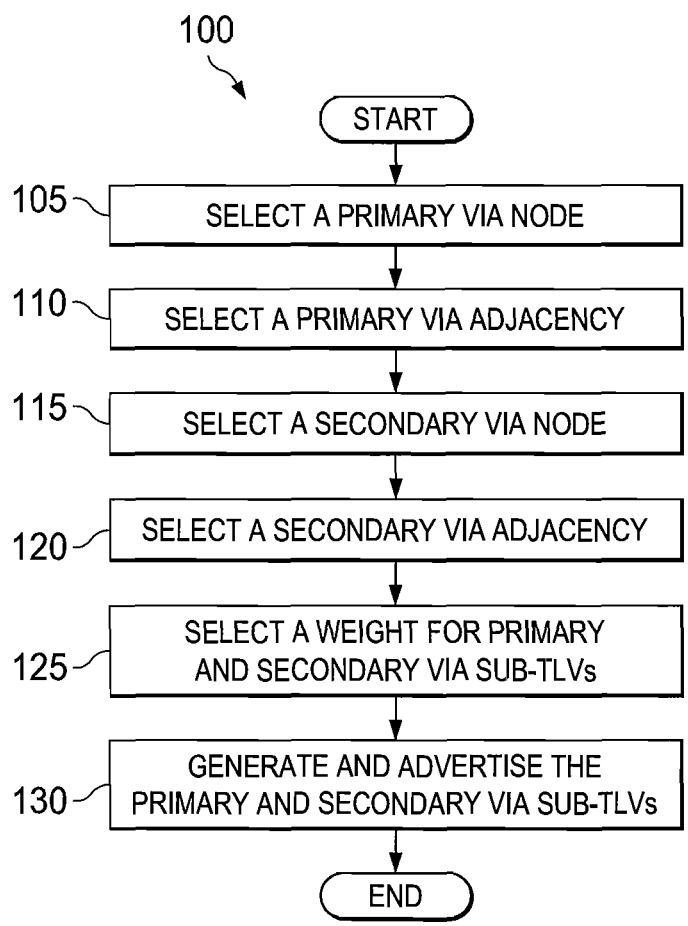
FIG. 5 is a simplified flowchart related to the system in accordance with one embodiment of the present disclosure.

FIG. 5 is a flowchart 100 illustrating an example method associated with the present disclosure. This generic flow is associated with generating and advertising routing data (e.g., VIA sub-TLVs) by a network element. In step 105, a primary via node is selected. In step 110, a primary via adjacency is selected. This could include, for example, network element 40 selecting interface 1. In step 115, a secondary via node is selected, where such an operation could include network element 40 selecting network element 24, as the secondary via node. In step 120, a secondary via adjacency is selected, where this could include network element 40 selecting interface 2. In step 125, a weight can be selected for primary and secondary VIA sub-TLVs. For example, the primary VIA sub-TLV could have a weight of ten, and the secondary VIA-sub-TLV could be assigned a weight of one-hundred. The weights can be set by service providers, by algorithms, be default settings, by gauging another parameter, by correlation to another metric or threshold, etc.

Subsequently, a loopback backup address can also be supplied. For example, should address R be unavailable on network element 40, address S on network element 40 can be used instead. Therefore, for a primary interface, a BACKUP_FEC: S could be generated, and for a secondary interface, a BACK_UP FEC: NULL could be generated. In other words, a FEC is generated among addresses R and S, and if address R is unavailable, but network element 24 and interface 2 are working properly, traffic can still be looped back to address S. In step 130, the primary and secondary VIA sub-TLVs are generated and advertised. For example, using the values highlighted above, a first VIA sub-TLV would be provided as: a) (VIA_NODE: network element 22, VIA_ADJ: Interface 16; WEIGHT: 10, BACKUP_FEC: S); and b) (VIA_NODE: network element 24, VIA_ADJ: Interface 18, WEIGHT 100, BACKUP_FEC: NULL).

Figure 6:
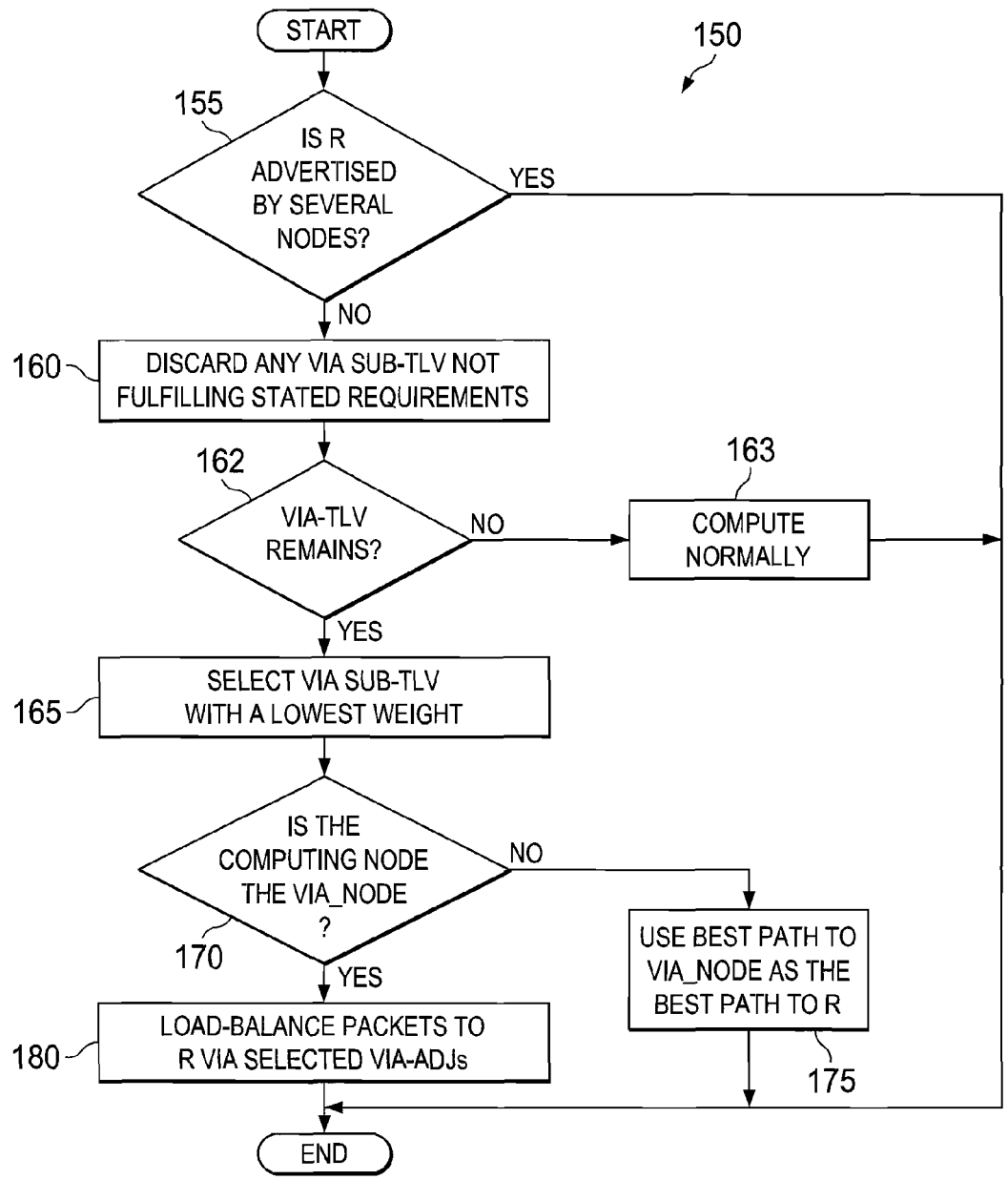
FIG. 6 is another simplified flowchart related to the system in accordance with one embodiment of the present disclosure.

FIG. 6 is a flowchart 150 illustrating an example method associated with the present disclosure. This generic flow is associated with a calculation and a generation of a routing path, where a given network element has received a packet that is to be forwarded. An extended IP reachability TLV (R) is flagged by at least one VIA sub-TLV in this example. In step 155, a determination is made as to whether address R advertised by several nodes. If address R is not advertised by multiple nodes such as IS-IS nodes (e.g., LSPs), then a network element would move to step 160. [For ease of explanation, a unique IS-IS node is described and identified as node Z, which can advertise address R.]

In step 160, a VIA sub-TLV not fulfilling the following requirements is discarded by a given router in the network: a) the VIA_NODE is reachable and is a direct neighbor of a node Z; and b) the adjacency VIA_ADJ between node Z and the VIA_NODE listed in the VIA sub-TLV is functional. For example, the VIA_ADJ listed as interface 1 between network element 22 and network element 40 could be identified as functional. The status of these requirements can be checked in a link state database (LSDB) by any IS-IS node in the topology. Stated differently, if either of these requirements is violated, the sub_TLV is ignored, which would usually result in a lower priority sub_TLV being accepted in its place and, therefore, the routing would still occur via this mechanism. Normal routing would occur if all the sub_TLVs were invalided. Returning back to the flow of FIG. 6, in step 162, a determination is made as to whether a VIA-TLV remains. If not, then the flow would shift to step 163, where a normal computation occurs.

In step 165, an evaluation is conducted for the remaining VIA sub-TLVs on a given node, where the sub-TLV with the lowest WEIGHT is selected. If several VIA sub-TLVs have the same lowest weight but a different VIA_NODE, a given network element can keep the sub-TLV or sub-TLVs from the lowest-id VIA_NODE. For example, if node Z advertises three VIA sub-TLVs (X, XZ1, 10, null), (X, XZ2, 10, null), and (Y, YZ1, 10, null), then the selected VIA sub-TLVs would be (X, XZ1, 10, null), (X, XZ2, 10, null) (i.e., because X<Y).

In step 170, a determination is made as to whether the node calculating the path is itself the VIA_NODE designated in the VIA sub-TLV. If it is not so designated, step 170 advances to step 175, where a best path to the VIA_NODE is used as a best path to address R. For example, if network element 22 is designated the VIA_NODE, then the best path to network element 22 is designated as the best path to address R. At this juncture, the network elements in a given topology should have selected the same VIA_NODE and, hence, looping should have been prevented. In step 180, where the computing node is the VIA_NODE itself, then the VIA_NODE can load-balance packets to address R via the selected VIA_ADJs of the VIA sub-TLVs. For example, a preferred VIA_NODE X (e.g., network element 22) can load-balance traffic to address R via multiple interfaces.

Figure 7:
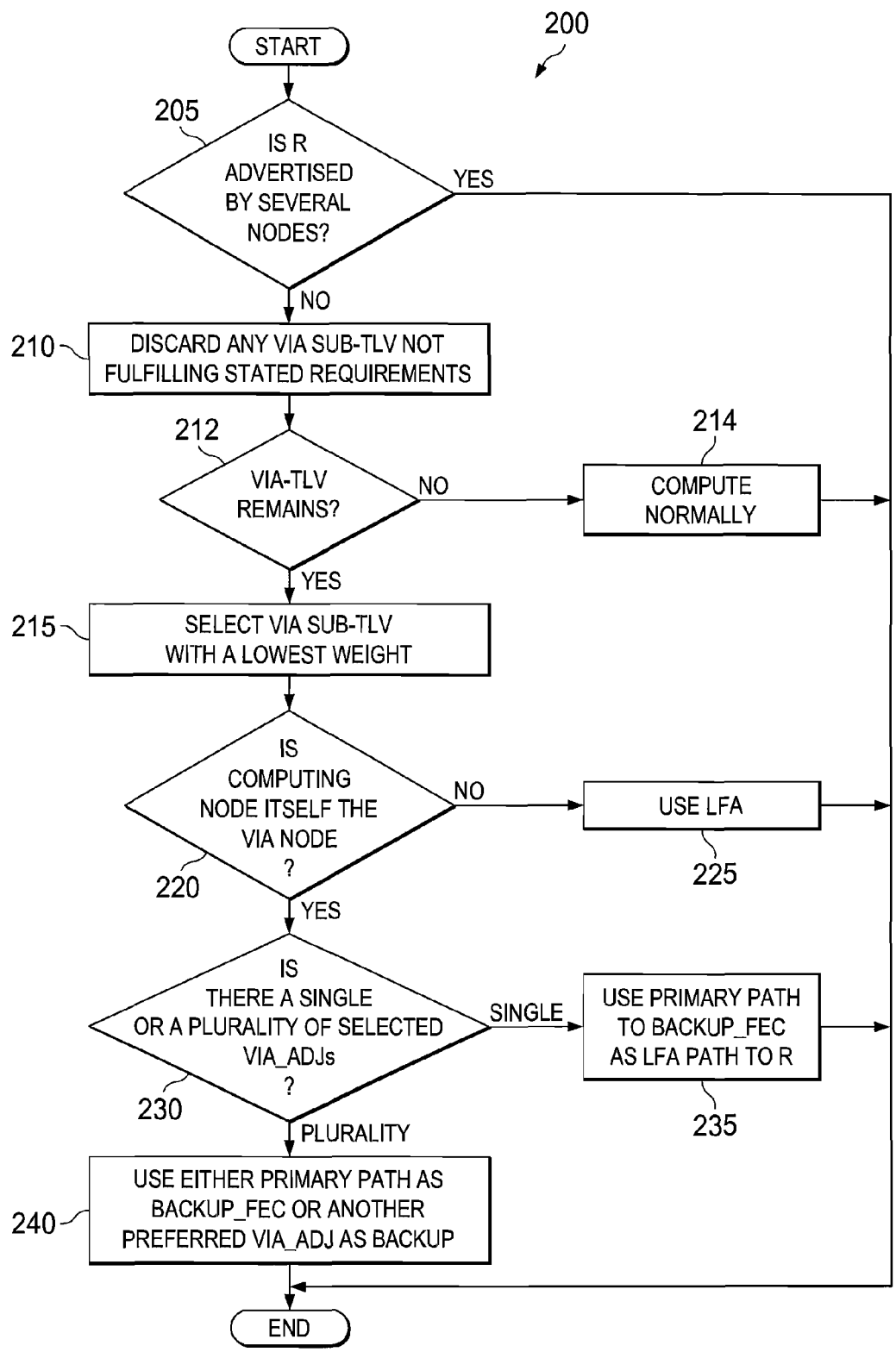
FIG. 7 is yet another simplified flowchart related to the system in accordance with one embodiment of the present disclosure.

Turning to FIG. 7, FIG. 7 is a flowchart 200 illustrating an example method associated with the present disclosure. This particular flow is associated with a failure in a network, which has not yet converged. More specifically, certain operations of FIG. 7 (further detailed below) are only invoked when the next-hop (as computed in the operations of FIG. 6) has failed. In certain instances, LFA protection can be used, where suitable pseudowire data is delivered to the appropriate line card. This particular flow begins at step 205, where a determination is made as to whether address R is advertised by several nodes. In step 210, a VIA sub-TLV not fulfilling the following requirements is discarded by a given network element (e.g., a router): a) the VIA_NODE is reachable and is a direct neighbor of a node Z; and b) the adjacency VIA_ADJ between node Z and the VIA_NODE listed in the VIA sub-TLV is functional. As mentioned above, the status of these requirements can be checked in a LSDB by any IS-IS node in the topology.

In step 212, a determination is made as to whether a VIA-TLV remains. If not, then the flow would shift to step 214, where a normal computation occurs. In step 215, from the remaining VIA sub-TLVs on a given node, a selection is made for the sub-TLV with the lowest WEIGHT. In step 220, a determination is made as to whether the network element calculating the path is the VIA_NODE designated in the VIA sub-TLV. In step 225, LFA is used. For example, a LFA path to the VIA_NODE can be used as the best path to address R.

Note that the need to use the LFA can be predicated on whether there is a failure of the next hop to the VIA-node. The LFA is simply not used in all cases. In more general terms, the network element operates as normal when it is not the VIA-node itself (i.e., the via sub-TLVs are checked to determine the via node, and normal forwarding is performed, as if the packet were actually addressed to the via node). In the case where the network has LFA protection, this would include using the LFA for the VIA-node when the normal next hop to the VIA-node has failed. This does not work when the network element is the VIA-node itself, and the VIA-node adjacent to the final destination has failed. This circumstance would result in utilizing a specific backup FEC, as explained herein.

Hence, step 230 outlines how a determination is made whether the network element has a single selected VIA_ADJ, or a plurality of selected VIA_ADJs. Note that this is only invoked when the next hop (as indicated by FIG. 6) has failed. In step 235, the network element is the VIA node itself in this example, and the primary path to the BACKUP_FEC can also be used as the LFA path to address R. There are at least two selected VIA_ADJs in this example such that either of the primary paths can be used as the BACKUP_FEC. Alternatively, another preferred VIA_ADJ can be used as a backup, as is reflected by step 240.

Note that in certain example implementations, the preferred path functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.) In some of these instances, a memory element (as shown in FIG. 2) can store data used for the operations described herein. This includes the memory element being able to store software, logic, code, or processor instructions that can be executed to carry out the activities described in this disclosure. A processor can execute any type of instructions associated with the data to achieve the operations detailed herein in this disclosure. In one example, the processor (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of rooms and sites, as well as more complicated/sophisticated arrangements and configurations. Accordingly, the examples provided herein should not limit the scope or inhibit the broad teachings of communication system 10 as potentially applied to a myriad of other architectures.

It is also important to note that the steps discussed with reference to FIGS. 1-7 illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although previous discussions have discussed pseudowires, communication system 10 is not confined to such pseudowire operations. Additionally, the present disclosure has been described as operating in IS-IS, IGP, OSPF, etc. environments or arrangements, the present disclosure may be used in any network environment that could benefit from such technology. Virtually any configuration that seeks to intelligently control preferred path routing settings could enjoy the benefits of the present disclosure. In the case of Service Wire technology, the teachings explained herein can allow a service node to attract the traffic from the classifier via the appropriate ingress line card with the proper set of service capabilities. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
   advertising information to network elements in a network environment, wherein the information advertises a reachability characteristic of a first Internet protocol (IP) address associated with a first network element, and a second IP address associated with a second network element to which packets are to be sent instead of the first network element; and
   receiving the packets at the first network element, wherein the packets are delivered from the second network element based on the information, wherein the information includes a preferred adjacency characteristic provided by a sub Type Length Value (sub-TLV) for routing the packets from the second network element to a preferred adjacent neighbor before reaching the first network element.

2. The method of claim 1, wherein the first network element is associated with a digital subscriber line access multiplexer (DSLAM).

3. The method of claim 1, wherein the first IP address is associated with a router having multiple loopback IP addresses that can be used for internal re-routing of incoming packets for the router.

4. The method of claim 1, wherein the first IP address is associated with a router that includes multiple line cards coupled to multiple interfaces, and wherein the information includes a sub-TLV that designates at least one of the interfaces over which packets are to be received.

5. The method of claim 1, wherein the information includes a sub-TLV that includes a weight attribute associated with a backup pathway for routing packets.

6. The method of claim 1, wherein if a failure occurs and a loop free alternate (LFA) protection mechanism is provisioned, the packets are sent via a label distribution protocol (LDP) label switched path (LSP) toward a designated interface of a network element.

7. The method of claim 1, wherein the information includes a sub Type Length Value (sub-TLV) to be provided in a link state packet TLV, and wherein the sub-TLV identifies the second IP address associated with the second network element, and wherein the sub-TLV is encapsulated in a TLV field of one or more link state protocol packets.

8. Non-transitory media that includes code for execution and when executed by a processor operable to perform operations comprising:
   advertising information to network elements in a network environment, wherein the information advertises a reachability characteristic of a first Internet protocol (IP) address associated with a first network element, and a second IP address associated with a second network element to which packets are to be sent instead of the first network element; and
   receiving the packets at the first network element, wherein the packets are delivered from the second network element based on the information, wherein the information includes a preferred adjacency characteristic provided by a sub Type Length Value (sub-TLV) for routing the packets from the second network element to a preferred adjacent neighbor before reaching the first network element.

9. The media of claim 8, wherein the first network element is associated with a digital subscriber line access multiplexer (DSLAM).

10. The media of claim 8, wherein the first IP address is associated with a router having multiple loopback IP addresses that can be used for internal re-routing of incoming packets for the router.

11. The media of claim 8, wherein the first IP address is associated with a router that includes multiple line cards coupled to multiple interfaces, and wherein the information includes a sub-TLV that designates at least one of the interfaces over which packets are to be received.

12. The media of claim 8, wherein the information includes a sub-TLV that includes a weight attribute associated with a backup pathway for routing packets.

13. The media of claim 8, wherein if a failure occurs and a loop free alternate (LFA) protection mechanism is provisioned, the packets are sent via a label distribution protocol (LDP) label switched path (LSP) toward a designated interface of a network element.

14. The media of claim 8, wherein the information includes a sub Type Length Value (sub-TLV) to be provided in a link state packet TLV, and wherein the sub-TLV identifies the second IP address associated with the second network element, and wherein the sub-TLV is encapsulated in a TLV field of one or more link state protocol packets.

15. An apparatus, comprising:
a memory element configured to store electronic code,
a processor operable to execute instructions associated with the electronic code, and
an engineering-preferred path module configured to interface with the processor and the memory element such that the apparatus is configured for:
advertising information to network elements in a network environment, wherein the information advertises a reachability characteristic of a first Internet protocol (IP) address associated with a first network element, and a second IP address associated with a second network element to which packets are to be sent instead of the first network element; and
receiving the packets at the first network element, wherein the packets are delivered from the second network element based on the information, wherein the information includes a preferred adjacency characteristic provided by a sub Type Length Value (sub-TLV) for routing the packets from the second network element to a preferred adjacent neighbor before reaching the first network element.

16. The apparatus of claim 15, wherein the first network element is associated with a digital subscriber line access multiplexer (DSLAM).

17. The apparatus of claim 15, wherein the first IP address is associated with a router having multiple loopback IP addresses that can be used for internal re-routing of incoming packets for the router.

18. The apparatus of claim 15, wherein the first IP address is associated with a router that includes multiple line cards coupled to multiple interfaces, and wherein the information includes a sub-TLV that designates at least one of the interfaces over which packets are to be received.

19. The apparatus of claim 15, wherein the information includes a sub-TLV that includes a weight attribute associated with a backup pathway for routing packets.

20. The apparatus of claim 15, wherein the information includes a sub Type Length Value (sub-TLV) to be provided in a link state packet TLV, and wherein the sub-TLV identifies the second IP address associated with the second network element, and wherein the sub-TLV is encapsulated in a TLV field of one or more link state protocol packets.

* * * * *